United States Patent
Zhou

(10) Patent No.: US 11,949,741 B2
(45) Date of Patent: Apr. 2, 2024

(54) DEVICE CONTROL METHOD, SERVER, AND STORAGE MEDIUM

(71) Applicant: ZTE CORPORATION, Shenzhen (CN)

(72) Inventor: Xiaoke Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/997,159

(22) PCT Filed: Aug. 24, 2021

(86) PCT No.: PCT/CN2021/114343
§ 371 (c)(1),
(2) Date: Oct. 26, 2022

(87) PCT Pub. No.: WO2022/062807
PCT Pub. Date: Mar. 31, 2022

(65) Prior Publication Data
US 2023/0254373 A1 Aug. 10, 2023

(30) Foreign Application Priority Data
Sep. 27, 2020 (CN) .......................... 202011034701.9

(51) Int. Cl.
*H04L 67/12* (2022.01)
(52) U.S. Cl.
CPC .................................. *H04L 67/12* (2013.01)
(58) Field of Classification Search
None
See application file for complete search history.

(56) References Cited

U.S. PATENT DOCUMENTS 6,400,729 B1  6/2002  Shimadoi et al.
10,235,353 B1 * 3/2019  Sanders ............ G06F 16/90332
(Continued)

FOREIGN PATENT DOCUMENTS

| CN | 105704234 A | 6/2016 |
| CN | 107395468 A | 11/2017 |

(Continued)

OTHER PUBLICATIONS

International Searching Authority. International Search Report and Written Opinion for PCT Application No. PCT/CN2021/114343 and English translation, dated Oct. 15, 2021, pp. 1-11.

(Continued)

*Primary Examiner* — Scott B Christensen
(74) *Attorney, Agent, or Firm* — Vivacqua Crane, PLLC

(57) ABSTRACT

A device control method, a server, and a non-transitory computer-readable storage medium are disclosed. The method may include, determining, in response to a receiving of a control instruction for controlling a target device, a target protocol model corresponding to the target device according to a device identifier of the target device and the control instruction, in which the target protocol model is a model pre-established according to a communication protocol supported by the target device; and sending a first control parameter corresponding to the control instruction in the target protocol model to the target device, to instruct the target device to perform an operation corresponding to the control instruction.

15 Claims, 3 Drawing Sheets

(56) References Cited

U.S. PATENT DOCUMENTS

| | | | |
|---|---|---|---|
| 10,805,155 B1* | 10/2020 | Le | H04L 69/18 |
| 2009/0291680 A1* | 11/2009 | Mort | H04L 67/565 |
| | | | 455/422.1 |
| 2011/0231543 A1* | 9/2011 | Akazawa | H04L 41/0806 |
| | | | 709/224 |
| 2013/0067090 A1* | 3/2013 | Batrouni | H04L 67/1097 |
| | | | 709/226 |
| 2013/0159447 A1* | 6/2013 | Wei | H04L 41/0886 |
| | | | 709/224 |
| 2016/0065653 A1 | 3/2016 | Chen et al. | |
| 2016/0072670 A1* | 3/2016 | Matthieu | H04L 69/18 |
| | | | 709/204 |
| 2016/0211985 A1* | 7/2016 | Castillo | F24F 11/62 |
| 2018/0278434 A1* | 9/2018 | Maseng | H04L 12/2814 |
| 2019/0332721 A1* | 10/2019 | Pathiyattuthody | G06F 3/0481 |
| 2019/0342179 A1* | 11/2019 | Barnard | H04L 41/0853 |

FOREIGN PATENT DOCUMENTS

| | | |
|---|---|---|
| CN | 110480633 A | 11/2019 |
| CN | 110912813 A | 3/2020 |
| CN | 111010406 A | 4/2020 |

OTHER PUBLICATIONS

European Patent Office. Extended European Search Report for EP Application No. 21871180.2, dated Sep. 8, 2023, pp. 1-8.
IP Australia. First Examination Report for AU application No. 2021346612, dated Jun. 29, 2023, pp. 1-4.

* cited by examiner

DEVICE CONTROL METHOD, SERVER, AND STORAGE MEDIUM

CROSS-REFERENCE TO RELATED APPLICATION

This application is a national stage filing under 35 U.S.C. § 371 of international application number PCT/CN2021/114343, filed Aug. 24, 2021, which claims priority to Chinese patent application No. 202011034701.9, filed Sep. 27, 2020. The contents of these applications are incorporated herein by reference in their entirety.

TECHNICAL FIELD

The present disclosure relates to the technical field of remote control, in particular to a method for controlling a device, a server and a non-transitory computer-readable storage medium.

BACKGROUND

Devices can be remotely managed by administrators via a remote management platform. That is, those devices can be remotely operated. For example, administrators can instruct smart meters to report the current electricity usage of users through the remote management platform. In particular, the remote management platform performs data interaction with the devices based on a certain communication protocol to achieve remote management. For example, the remote management platform performs data interaction with the devices based on the Message Queuing Telemetry Transport (MQTT) protocol to achieve remote management. Usually, a remote management platform can only manage devices that support one type of communication protocol.

SUMMARY

In view of this, a method for controlling a device, a server and a non-transitory computer-readable storage medium are provided according to various embodiments of the present disclosure.

According to an aspect of the present disclosure, there is provided a method for controlling a device, which may include, determining, in response to a receiving of a control instruction for controlling a target device, a target protocol model corresponding to the target device according to a device identifier of the target device and the control instruction, in which, the target protocol model is a model pre-established according to a communication protocol supported by the target device; and sending a first control parameter corresponding to the control instruction in the target protocol model to the target device, to instruct the target device to perform an operation corresponding to the control instruction.

According to another aspect of the present disclosure, there is provided a server, which may include at least one processor, and at least one memory storing a computer program, which when executed by the processor, causes the processor to carry out the method as described above.

According to yet another aspect of the present disclosure, there is provided a non-transitory computer-readable storage medium storing a computer program, which when executed by a processor, causes the processor to carry out the method as described above.

DETAILED DESCRIPTION

Figure 1:
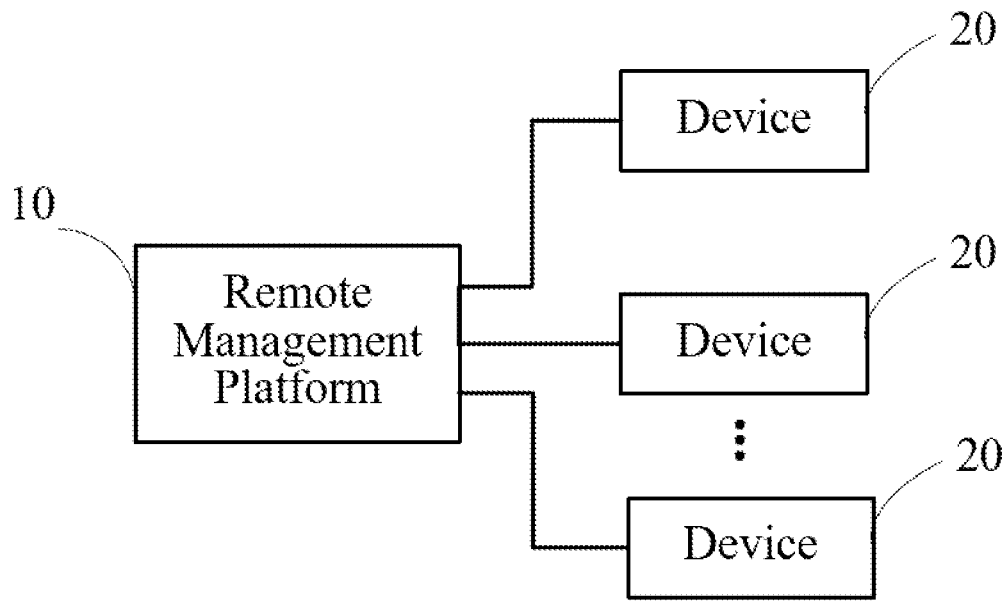
FIG. 1 depicts a schematic diagram showing an application scenario of various embodiments of the present disclosure.

Embodiments of the present disclosure will be described below in conjunction with the drawings. It is apparent that, the described embodiments are some of the embodiments of present disclosure, but not all. Based on the embodiments described herein, all other embodiments that can be achieved by those having ordinary skill in the art without creative labor shall fall within the scope of protection of the present disclosure.

The flowcharts as shown in the drawings are illustrative merely, and it is not necessary to include all the contents and operations/steps. And the operations/steps are not necessarily executed in the described order. For example, some operations/steps can be decomposed, combined or partially merged, so the actual order of the operations/steps may change according to the practical situation.

Some embodiments will be illustrated in conjunction with the drawings. The following embodiments and features described in the embodiments can be combined with each other without conflict.

According to an embodiment of the present disclosure, there is provided a method for controlling a device, the method can be applied to the application scenario as shown in FIG. 1. In this scenario, a remote management platform 10 can connect to a plurality of devices 20 which support various communication protocols. That is, the types of protocols supported by each device 20 may be different. For example, some devices 20 may support MQTT protocol, some devices 20 may support TR069 protocol, and some devices 20 may support Open Mobile Alliance Device Management (OMADM) protocol.

In some embodiments, the remote management platform 10 may be deployed on a server. An administrator may access the remote management platform 10 through a browser or an application embedded with a browser kernel, so as to remotely operate the device 20. For example, the administrator may access the remote management platform 10 through a browser on a computer, and then remotely operate the device 20 via the browser. When accessing the remote management platform 10, the administrator can log in to an account via which the administration privilege of the administrator can be determined. In some embodiments, the devices 20 may be wired or wireless devices accessing networks, or the like. For example, the devices 20 may be smart water meters, smart electricity meters, or the like.

Figure 2:
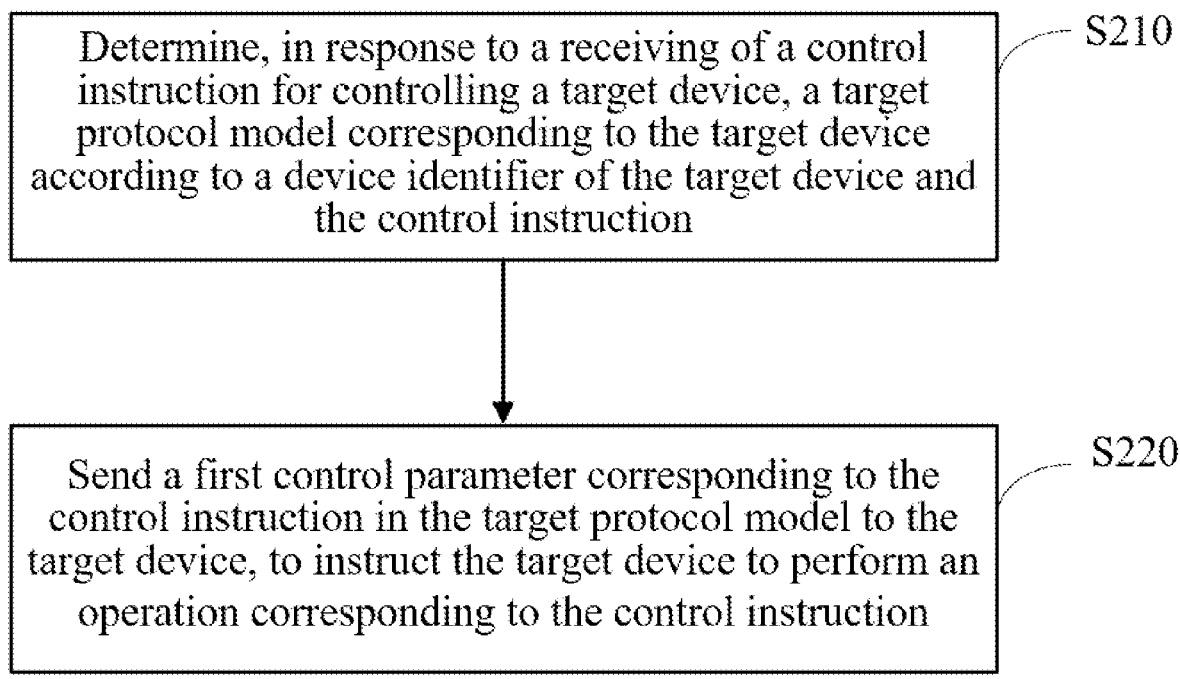
FIG. 2 depicts a flowchart showing a method for controlling a device control according to an embodiment of the present disclosure.

As shown in FIG. 2A, there is provided a method for controlling a device according to an embodiment, the method can be applied to a remote management platform deployed on a server, and the method includes but is not limited to the following operations S210 to S220.

At S210, in response to a receiving of a control instruction for controlling a target device, a target protocol model corresponding to the target device is determined according to a device identifier of the target device and the control instruction.

At S220, a first control parameter corresponding to the control instruction in the target protocol model is sent to the target device, to instruct the target device to perform an operation corresponding to the control instruction.

The received control instruction by the remote management platform may be a control instruction sent to the remote management platform by a device or a terminal device. In some embodiments, the received control instruction by the remote management platform may include, but is not limited to the following.

(1) A control instruction received by the remote management platform from a terminal device. For example, when the administrator needs a report of the water consumption from an intelligent water meter, the administrator can access the remote management platform through the terminal device and send a control instruction of the corresponding intelligent water meter to the platform, so that the remote management platform can receive the control instruction.

(2) A control instruction received by the remote management platform from a first device. For example, the first device is a current sensor, which is configured to detect the operating current of a second device. On this basis, when detecting an abnormal condition in the operating current of the second device, the current sensor may send a control instruction for turning off the second device to the remote management platform, so that the remote management platform can receive the control instruction.

The device identifier may refer to the identification that can denote the target device. Simply, the device identifier is the identity information of the target device. For example, the device identifier may include, International Mobile Equipment Identity (IMEI), Serial Number (SN), product serial number, IP address and so on.

It should be noted that several protocol models may be pre-established on the server, and each protocol model is pre-established according to a communication protocol, that is, one protocol model corresponds to one communication protocol. In addition, a control parameter that corresponds to a control instruction is stored in each protocol model. For example, the control parameter stored in the first protocol model may correspond to the control instruction for "monitoring data flow", while the control parameter stored in the second protocol model may correspond to the control instruction for "turning on the Wi-Fi switch". In some embodiments, the control parameters may be one or more protocol nodes or one or more protocol parameters. It can be understood that the target protocol model is a model pre-established according to the communication protocol supported by the target device. And the first control parameter in the target protocol model corresponds to the control instruction described in S210.

On this basis, the remote management platform, when receiving the control instruction, can determine the target protocol model of the corresponding target device according to the device identifier and the control instruction of the target device. It can be understood that the communication protocol corresponding to the target protocol model is the communication protocol supported by the target device. Once the target protocol model is determined, due to the correspondence of the first control parameter in the target protocol model to the control instruction received by the remote management platform, the first control parameter is determined in the target protocol model and is sent to the target device. And the target device can perform the operation corresponding to the control instruction after receiving the first control parameter.

For example, two protocol models are pre-established on the serve, in which the first protocol model corresponds to MQTT protocol, and the first control parameter in the first protocol model includes one or more protocol parameters. For example, the first protocol model may include, [{"gpsTime": 1590374995000, "latitude": 23.456789, "longitude":12.345678}], that indicates three protocol parameters stored in the first protocol model, i.e., "gpsTime" (representing the time in the GPS), "latitude" (representing the latitude) and "longitude" (representing the longitude). The second protocol model corresponds to Technical Report-181 (TR181) protocol, then the first control parameter in the second protocol model includes one or more protocol nodes. For example, the second protocol model includes, Device.WiFi.Radio.2.Enable, and the protocol nodes such as "Device", "WiFi", "Radio", "2" and "Enable" are stored in the second protocol model. In addition, the first control parameter in the second protocol model may correspond to the control instruction for "turning on the Wi-Fi switch". Therefore, when receiving the control instruction for "turning on the Wi-Fi switch" for controlling the target device, the remote management platform can determine that the target protocol model is the second protocol model according to the SN code and the control instruction for "turning on the Wi-Fi switch". The remote management platform then sends the first control parameter corresponding to the control instruction in the second protocol model to the target device to turn on the Wi-Fi switch of the target device.

In an embodiment, S210 includes but is not limited to the following operations S211 through S212.

At S211, the communication protocol supported by the target device is determined, according to the device identifier of the target device and a preset mapping table.

At S212, the target protocol model is determined, according to the communication protocol supported by the target device and the control instruction.

It can be seen from the foregoing that several protocol models each corresponding to a communication protocol, may be pre-established on the server. In addition, each protocol model is established according to a device to be controlled which usually supports a communication protocol. Therefore, during the establishment of the protocol models, the device identifiers of one or more devices to be controlled and their supported communication protocols can be stored in the mapping table. On this basis, the communication protocol supported by the target device can be found in the mapping table according to the device identifier of the target device, and then the target protocol model can be determined according to the type of the protocol and the control instruction.

In an embodiment, S212 includes but is not limited to the following operations S213 through S214.

At S213, at least one corresponding protocol model is selected from a plurality of preset protocol models, according to the communication protocol supported by the target device.

At S214, a protocol model corresponding to the control instruction is determined as the target protocol model from one or more protocol models, according to the control instruction.

Regarding devices of various types, the communication protocol supported by these devices may be the same communication protocol, but these devices may have different functions due to their own hardware configuration.

For example, device A, device B and device C all support TR181 protocol, while device A has the function of network locking, device B has the function of device binding, and device C has the function of data traffic monitoring. Based on this, protocol model A, protocol model B and protocol model C established respectively based on device A and device C may all correspond to the same communication protocol, such as TR181 protocol, but the control parameters stored in these three protocol models are different. For example, one or more control parameters stored in protocol model A are related to network locking, one or more control parameters stored in protocol B are related to device binding, and one or more control parameters stored in protocol C are related to data flow monitoring. It can be understood that each protocol model corresponds to a communication protocol and a control instruction.

Based on this, one or more protocol models can be selected according to the communication protocol supported by the target device, and these protocol models correspond to the communication protocol of the type. Then, the protocol model corresponding to the control instruction is determined from the protocol models as the target protocol model according to the control instruction. For example, in case that the control instruction is an instruction for "turning on the Wi-Fi switch", the target protocol model can be determined according to this control instruction, and the first control parameter in the target protocol model corresponds to the control instruction for "turning on the Wi-Fi switch".

In an example, a target protocol model corresponding to the target device is pre-established on the server, and the target protocol model may correspond to the TR181 protocol. The device identifier of the target device and the communication protocol supported by the target device are stored in the mapping table during the establishment of the target protocol model. Therefore, when receiving the control instruction for controlling the target device, the remote management platform can determine that the communication protocol supported by the target device is the TR181 protocol from the mapping table according to the device identifier (such as the SN code) of the target device, then finds one or more protocol models corresponding to the TR181 protocol on the server. The remote management platform then determines the target protocol model from these protocol models according to the control instruction. For example, in case that the control instruction is an instruction for "turning on the Wi-Fi switch", then the first control parameter in the target protocol model as determined corresponds to the control instruction for "turning on the Wi-Fi switch".

Figure 3:
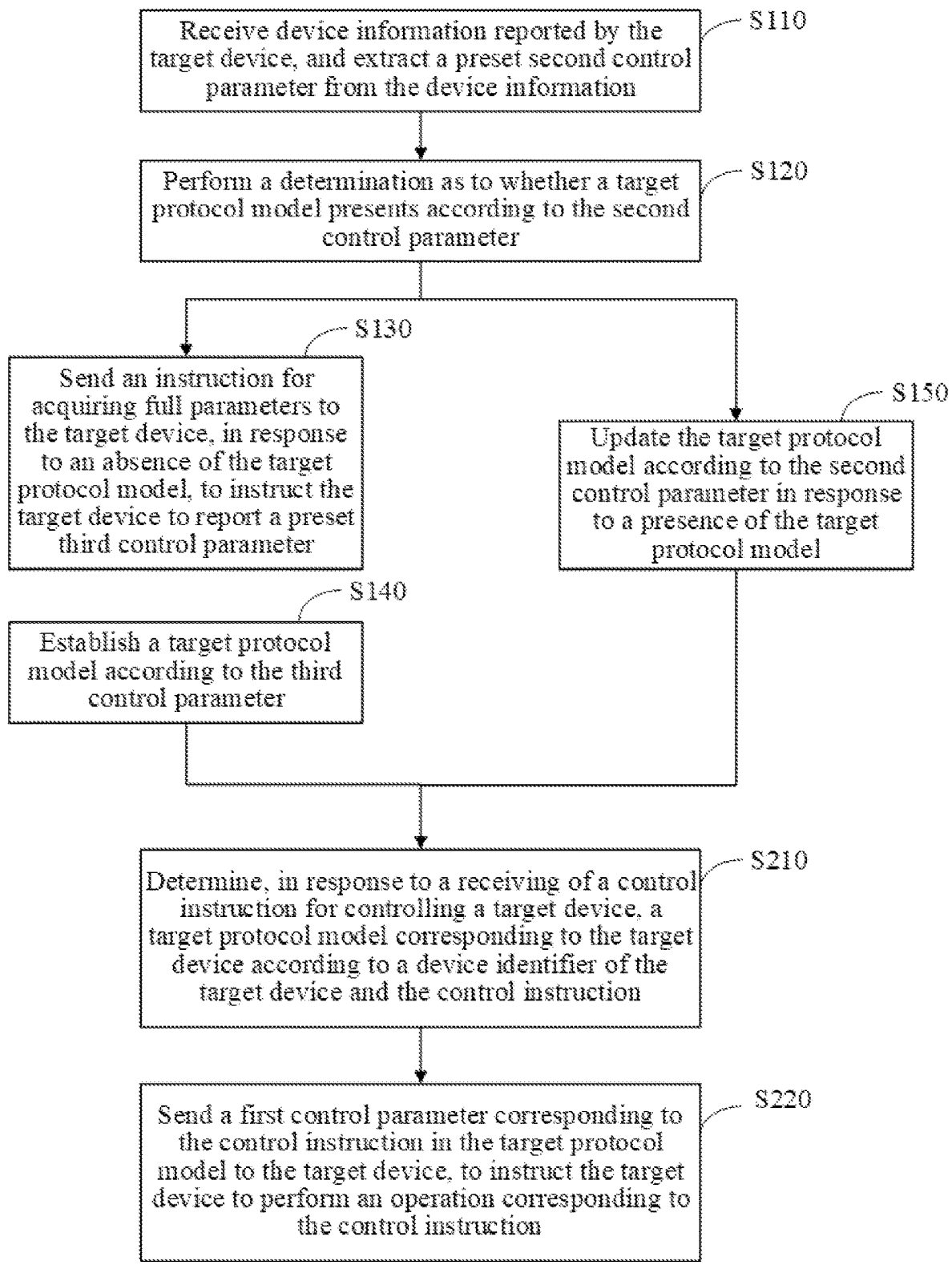
FIG. 3 depicts a flowchart showing a method for controlling a device control according to another embodiment of the present disclosure.

In an embodiment, as shown in FIG. 3, before S210 is performed, the method includes but is not limited to operations S110 through S140.

At S110, device information reported by the target device is received, and a preset second control parameter is extracted from the device information.

At S120, a determination as to whether a target protocol model presents, is performed according to the second control parameter.

At S130, an instruction for acquiring full parameters is sent to the target device, in response to an absence of the target protocol model, to instruct the target device to report a preset third control parameter.

At S140, a target protocol model is established according to the third control parameter.

Before the determination of the target protocol model of the corresponding target device is performed, a determination as to a target protocol model presents can be performed.

S210 is performed in response to a presence of the target protocol model. Alternatively, a target protocol model corresponding to the target device is to be established in response to an absence of the target protocol model. Thereby, the device information reported by the target device can be received. Since the device information is the reported information generated by the target device according to the communication protocol supported by the target device. In other words, the device information includes a second control parameter corresponding to the communication protocol, such as some necessary protocol nodes or protocol parameters specified by the communication protocol, so that the second control parameter can be extracted from the device information to determine whether the target protocol model presents or not according to the second control parameter.

In an embodiment, S120 includes but is not limited to the following operation S121.

At S121, the second control parameter is matched with a control parameter stored in each preset protocol model respectively to determine whether the target protocol model presents.

As control parameters are stored in each protocol model, the second control parameter can be matched with each pre-established protocol model. That is, the second control parameter can be matched with the control parameters stored in each of the protocol models. For example, a determination as to whether the second control parameter is included in the control parameters stored in the protocol models. If the second control parameter is included, it means that the matching is done, that is, the target protocol model is present, otherwise the target protocol model is not present.

Therefore, it can be seen from the foregoing that it is necessary to establish the target protocol model in response to an absence of the target protocol model. On this basis, since the second control parameter in the device information can include some protocol nodes or some protocol parameters, such as some necessary protocol nodes or protocol parameters specified by the communication protocol, the instruction for acquiring full parameters can be sent to the target device, so that the target device can report the preset third control parameter. In some embodiments, the third control parameter includes all protocol nodes or all protocol parameters, such as necessary protocol nodes or protocol parameters and other protocol nodes or protocol parameters. It can be understood that the third control parameter includes the second control parameter. Thereby, the target protocol model can be established according to the third control parameter. In some embodiments, the third control parameter can be processed and stored in the newly created protocol model to generate the protocol model corresponding to the target device.

In an embodiment, as shown in FIG. 3, before S120 is performed, the method includes but is not limited to operation S150.

At S150, the target protocol model is updated according to the second control parameter in response to a presence of the target protocol model.

The presence of the target protocol model indicates that the corresponding protocol model has been established for the target device, and it is unnecessary to establish the target protocol model in that case. In some embodiments, the target protocol model can be updated according to the second control parameter. For example, one or more protocol nodes or protocol parameters in the second control parameter can be replaced by the same protocol nodes or protocol parameters in the target protocol model. Additionally, or alternatively, some protocol nodes or protocol parameters that do not belong to the target protocol model can be removed from the model.

It can be understood from the above description that for devices supporting different communication protocols, corresponding protocol models to the devices can be established on the server. In this way, when receiving the control instruction for controlling the target device, the remote management platform can determine the target protocol model according to the device identifier and the control instruction. Then, the remote management platform sends the first control parameter corresponding to the control instruction in the target protocol model to the target device, to instruct the target device to perform a corresponding operation, such that remote management is achieved. For example, for device A, device B and device C that support different communication protocols, the corresponding protocol model A, protocol model B and protocol model C can be pre-established respectively on the server. Thus, when receiving the control instruction for controlling device A, the remote management platform can determine the protocol model A, and sends the first control parameter corresponding to the control instruction in the protocol model A to device A, to instruct device A to perform a corresponding operation. Similar operations apply to device B and device C, which will not be repeated here. According to an embodiment of the present disclosure, a remote management platform can manage several devices supporting different communication protocols. And thus, it is unnecessary to build several remote management platforms, which is very convenient and reduces the operation and maintenance cost for administrators. In addition, when a new device is added by ab administrator, the remote management of the device can be achieved by establishment of the corresponding protocol model on the server, thus improving the user experience of the administrators.

Figure 4:
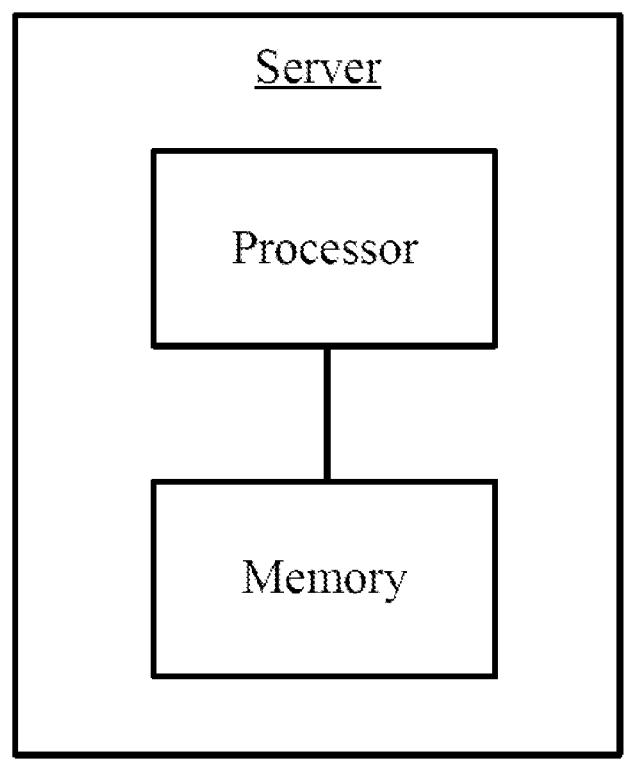
FIG. 4 depicts a schematic diagram showing a server according to an embodiment of the present disclosure.

According to an embodiment, there is further provided a server, as shown in FIG. 4, the server includes at least one processor and at least one memory for storing a computer program which when executed by the processor, causes the processor to carry out the method for controlling a device according to any one of the embodiments of the present disclosure.

It should be understood that the processor can be a Central Processing Unit (CPU), and the processor can also be other general-purpose processors, Digital Signal Processor (DSP), application-specific integrated circuit (ASIC), Field-Programmable Gate Array (FPGA) or other programmable logic devices, discrete gate or transistor logic devices, discrete hardware components, or the like. The general-purpose processor may be a microprocessor or the processor may be any conventional processor, or the like.

According to an embodiment of the present disclosure, there is further provided a non-transitory computer-readable storage medium storing a computer program, which when executed by a processor, causes the processor to carry out the method for controlling a device according to any one of the embodiments of the present disclosure.

Provided are a method for controlling a device, a server and a non-transitory computer-readable storage medium according to various embodiments of the present disclosure, Corresponding protocol models can be pre-established for devices supporting different communication protocols. In this way, when receiving the control instruction for controlling the target device, the remote management platform can determine the target protocol model according to the device identifier of the target device and the control instruction, and send the first control parameter corresponding to the control instruction in the target protocol model to the target device, to instruct the target device to perform the corresponding operation to achieve remote management. The target protocol model is a model pre-established according to a communication protocol supported by the target device. According to various embodiments of the present disclosure, a remote management platform can manage several devices supporting various communication protocols. And thus, it is unnecessary to build several remote management platforms, which is very convenient and reduces the operation and maintenance cost for administrators.

It shall be appreciated by a person having ordinary skills in the art that all or some of the steps, functional modules/units in the methods, systems and devices disclosed above can be implemented as software, firmware, hardware and their appropriate combinations. In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media).

As is well known to a person having ordinary skills in the art, the term computer storage media includes volatile and nonvolatile, removable and non-removable media implemented in any method or technology for storing information such as computer-readable instructions, data structures, program modules or other data. Computer storage medium include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to a person having ordinary skills in the art that communication media usually contains computer-readable instructions, data structures, program modules or other data in modulated data signals such as carrier waves or other transmission mechanisms, and can include any information delivery media.

In some examples, the computer-readable storage medium may be the internal storage unit of the server described in the embodiments previously described, such as the hard disk or memory of the server. The computer-readable storage medium may also be the external storage device of the server, such as the plug-in hard disk, Smart Media Card (SMC), Secure Digital (SD) card, Flash Card, that are equipped with the server, or the like.

Described above are only some embodiments of the present disclosure. However, the scope of the present disclosure is not limited thereto. Those having ordinary skill in the art, can readily envisage various equivalent modifications or substitutions within the technical scope disclosed in the present disclosure, and these modifications or substitutions should be included in the scope of the present disclosure. Therefore, the scope of protection of the present disclosure shall be defined by the claims.

What is claimed is:

1. A method for controlling a device, comprising,
receiving device information reported by a target device, and extracting a preset second control parameter from the device information;
performing a determination as to whether a target protocol model presents according to the second control parameter, wherein it is determined that the target protocol model is absent, wherein the preset second control parameter consists of a portion of protocol parameters or a portion of protocol nodes of the target device;
sending an instruction for acquiring full parameters to the target device, in response to the absence of the target protocol model, to instruct the target device to report a preset third control parameter, wherein the preset third control parameter comprises all protocol parameters or all protocol nodes of the target device;
establishing the target protocol model according to the third control parameter, wherein the target protocol model is stored in association with a specific communication protocol;
determining, in response to a receiving of a control instruction for controlling the target device, the target protocol model corresponding to the target device according to a device identifier of the target device and the control instruction, wherein, the target protocol model is determined according to a communication protocol supported by the target device, and wherein the target protocol model stores a first control parameter that corresponds to the control instruction; and
sending the first control parameter corresponding to the control instruction in the target protocol model to the target device, to instruct the target device to perform an operation corresponding to the control instruction.

2. The method of claim 1, wherein, the determining of a target protocol model corresponding to the target device according to a device identifier of the target device and the control instruction, comprises,
determining, according to the device identifier of the target device and a preset mapping table, the communication protocol supported by the target device, wherein, the preset mapping table stores a device identifier of a device to be controlled, and a communication protocol supported by the device to be controlled; and
determining the target protocol model, according to the communication protocol supported by the target device and the control instruction and the first control parameter comprises at least one of, a protocol node of the protocol nodes of the target device, or a protocol parameter of the protocol parameters of the target device.

3. The method of claim 2, wherein, the determining of the target protocol model, according to the communication protocol supported by the target device and the control instruction, comprises,
selecting, according to the communication protocol supported by the target device, at least one protocol model corresponding to the communication protocol, from a plurality of preset protocol models, wherein, each of the at least one protocol model corresponds to one communication protocol and one control instruction; and
determining, according to the control instruction, a protocol model corresponding to the control instruction as the target protocol model from the at least one protocol model.

4. The method of claim 1, wherein, the performing of a determination as whether a target protocol model presents according to the second control parameter, comprises,
matching the second control parameter with a control parameter stored in each preset protocol model respectively to determine whether the target protocol model presents.

5. The method of claim 1, further comprising,
updating the target protocol model according to the second control parameter in response to a presence of the target protocol model.

6. The method of claim 1, wherein, the device information is report information generated by the target device according to the communication protocol supported by the target device.

7. A server, comprising at least one processor, and at least one memory storing a computer program, which when executed by the processor, causes the processor to carry out a method for controlling a device, comprising,
receiving device information reported by a target device, and extracting a preset second control parameter from the device information;
performing a determination as to whether a target protocol model presents according to the second control parameter, wherein it is determined that the target protocol model is absent, wherein the preset second control parameter consists of a portion of protocol parameters or a portion of protocol nodes of the target device;
sending an instruction for acquiring full parameters to the target device, in response to the absence of the target protocol model, to instruct the target device to report a preset third control parameter, wherein the preset third control parameter comprises all protocol parameters or all protocol nodes of the target device;
establishing the target protocol model according to the third control parameter, wherein the target protocol model is stored in association with a specific communication protocol;
determining, in response to a receiving of a control instruction for controlling the target device, the target protocol model corresponding to the target device according to a device identifier of the target device and the control instruction, wherein, the target protocol model is determined according to a communication protocol supported by the target device, wherein, the target protocol model stores a first control parameter that corresponds to the control instruction; and
sending the first control parameter corresponding to the control instruction in the target protocol model to the target device, to instruct the target device to perform an operation corresponding to the control instruction.

8. The server of claim 7, wherein, the determining of a target protocol model corresponding to the target device according to a device identifier of the target device and the control instruction, comprises,
determining, according to the device identifier of the target device and a preset mapping table, the communication protocol supported by the target device, wherein, the preset mapping table stores a device identifier of a device to be controlled, and a communication protocol supported by the device to be controlled; and
determining the target protocol model, according to the communication protocol supported by the target device and the control instruction.

9. The server of claim 8, wherein, the determining of the target protocol model, according to the communication protocol supported by the target device and the control instruction, comprises, selecting, according to the communication protocol supported by the target device, at least one protocol model corresponding to the communication protocol, from a plurality of preset protocol models, wherein, each of the at least one protocol model corresponds to one communication protocol and one control instruction; and determining, according to the control instruction, a protocol model corresponding to the control instruction as the target protocol model from the at least one protocol model.

10. The server of claim 7, wherein, the performing of a determination as whether a target protocol model presents according to the second control parameter, comprises, matching the second control parameter with a control parameter stored in each preset protocol model respectively to determine whether the target protocol model presents.

11. The server of claim 7, further comprising, updating the target protocol model according to the second control parameter in response to a presence of the target protocol model.

12. The server of claim 7, wherein, the device information is report information generated by the target device according to the communication protocol supported by the target device.

13. A non-transitory computer-readable storage medium storing a computer program, which when executed by a processor, causes the processor to carry out a method for controlling a device, comprising, receiving device information reported by a target device, and extracting a preset second control parameter from the device information;

performing a determination as to whether a target protocol model presents according to the second control parameter, wherein it is determined that the target protocol model is absent, wherein the preset second control parameter consists of a portion of protocol parameters or a portion of protocol nodes of the target device;

sending an instruction for acquiring full parameters to the target device, in response to the absence of the target protocol model, to instruct the target device to report a preset third control parameter, wherein the preset third control parameter comprises all protocol parameters or all protocol nodes of the target device;

establishing the target protocol model according to the third control parameter, wherein the target protocol model is stored in association with a specific communication protocol;

determining, in response to a receiving of a control instruction for controlling the target device, the target protocol model corresponding to the target device according to a device identifier of the target device and the control instruction, wherein, the target protocol model is determined according to a communication protocol supported by the target device, wherein, the target protocol model stores a first control parameter that corresponds to the control instruction; and sending the first control parameter corresponding to the control instruction in the target protocol model to the target device, to instruct the target device to perform an operation corresponding to the control instruction.

14. The non-transitory computer-readable storage medium of claim 13, wherein, the determining of a target protocol model corresponding to the target device according to a device identifier of the target device and the control instruction, comprises, determining, according to the device identifier of the target device and a preset mapping table, the communication protocol supported by the target device, wherein, the preset mapping table stores a device identifier of a device to be controlled, and a communication protocol supported by the device to be controlled; and determining the target protocol model, according to the communication protocol supported by the target device and the control instruction.

15. The non-transitory computer-readable storage medium of claim 14, wherein, the determining of the target protocol model, according to the communication protocol supported by the target device and the control instruction, comprises, selecting, according to the communication protocol supported by the target device, at least one protocol model corresponding to the communication protocol, from a plurality of preset protocol models, wherein, each of the at least one protocol model corresponds to one communication protocol and one control instruction; and determining, according to the control instruction, a protocol model corresponding to the control instruction as the target protocol model from the at least one protocol model.

\* \* \* \* \*